United States Patent [19]
Walth et al.

[11] Patent Number: 5,501,309
[45] Date of Patent: Mar. 26, 1996

[54] HYDROKINETIC TORQUE CONVERTER WITH LOCKUP CLUTCH

[75] Inventors: Ernst Walth, Heilbronn; Georg Weidner, Bühl, both of Germany

[73] Assignee: LuK Getriebe-Systeme GmbH, Bühl, Germany

[21] Appl. No.: 281,409

[22] Filed: Jul. 27, 1994

[30] Foreign Application Priority Data

Jul. 30, 1993 [DE] Germany ................. 43 25 605.8

[51] Int. Cl.$^6$ ................. F16H 45/02; F16D 13/72
[52] U.S. Cl. ................. 192/3.29; 192/113.36
[58] Field of Search ................. 192/3.28, 3.29, 192/3.3, 113.36

[56] References Cited

U.S. PATENT DOCUMENTS

| | | | |
|---|---|---|---|
| 4,493,406 | 1/1985 | Bopp | 192/58 B |
| 4,964,543 | 11/1990 | MacDonald | 192/3.29 |
| 4,986,397 | 1/1991 | Vierk | 192/3.3 |
| 5,335,765 | 8/1994 | Takakura et al. | 192/113.36 X |

FOREIGN PATENT DOCUMENTS

| | | | |
|---|---|---|---|
| 2490756 | 3/1982 | France | 192/113.36 |
| 58-30532 | 2/1982 | Japan | 192/113.36 |
| 5-272615 | 10/1993 | Japan | 192/3.29 |

*Primary Examiner*—Richard M. Lorence
*Attorney, Agent, or Firm*—Darby & Darby

[57] ABSTRACT

A hydrokinetic torque converter comprises a lockup clutch having an annular piston which is reciprocable in the direction of the axis of rotation of the housing of the torque converter and carries a friction lining having a friction surface which bears against a friction surface at the inner side of the housing when the lockup clutch is engaged. At least one of the friction surfaces is provided with channels defining passages for the flow of a fluid coolant from a first internal compartment of the housing toward a second compartment located radially inwardly of the friction surfaces. The piston and/or the housing is resiliently deformable so that it can influence the rate of fluid flow through the passages. The width of the passages decreases gradually radially inwardly from the first compartment toward the second compartment, and the passages slope radially outwardly in the direction of rotation of the housing. The pump, the stator and the turbine of the torque converter are installed in the first compartment of the housing.

23 Claims, 4 Drawing Sheets

HYDROKINETIC TORQUE CONVERTER WITH LOCKUP CLUTCH

CROSS-REFERENCE TO RELATED CASE

The invention which is disclosed in the present application is related to the invention disclosed in the commonly owned co-pending U.S. patent application Ser. No. 08/272,920, filed Jul. 8, 1994 by Dieter Otto and Volker Middleman for "Hydrokinetic Torque Converter And Lockup Clutch Therefor".

BACKGROUND OF THE INVENTION

The present invention relates to improvements in hydrokinetic torque converters as well as to improvements in lockup clutches or bypass clutches which are utilized in torque converters. More particularly, the invention relates to improvements in torque converters of the character wherein a rotary housing defines a chamber for a pump, a turbine, a stator and a lockup or bypass clutch (hereinafter called lockup clutch), and wherein the clutch comprises an axially movable annular piston serving to divide the chamber into a first compartment and a second compartment. The chamber is filled with a fluid coolant (such as oil), and the piston is provided with or carries a first friction surface which can be moved into torque transmitting engagement with a second friction surface (which rotates with the housing) when the clutch is engaged. Still more particularly, the invention relates to improvements in hydrokinetic torque converters and lockup clutches wherein the first compartment is disposed between the piston and a component which carries the second friction surface and wherein the piston and/or the component is provided with one or more passages serving to establish one or more paths for the flow of fluid coolant from the second compartment (which accommodates the turbine, the pump and/or the stator of the torque converter) toward the first compartment.

U.S. Pat. No. 4,969,543 (granted Nov. 13, 1990 to Macdonald for "Slipping Bypass Clutch Construction For A Hydrokinetic Torque Converter") discloses a lockup clutch which comprises an annular piston provided with a first friction surface adapted to be moved against a second friction surface which is provided on a substantially radially extending wall of the housing of the torque converter. The piston or a friction lining on the wall of the housing is provided with several channels serving to permit a fluid to flow from the second compartment into the first compartment within the housing, even when the lockup clutch is engaged. The channels are provided at the same radial distance from the rotational axis of the housing as the friction surfaces, the first compartment of the chamber is disposed between the piston and the wall of the housing, and the second compartment serves to confine at least the turbine of the torque converter. The patentee attempts to prevent excessive thermal stressing of certain constituents of the torque converter; which thermal stressing could develop during continuous slipping of the friction surfaces of the lockup clutch when the torque converter is in use. More specifically, the patentee attempts to prevent excessive thermal stressing of the parts in the region of the friction surfaces of the lockup clutch.

Published Japanese patent application No. 58-30532 discloses a lockup clutch which is intended for use in torque converters and is also provided with channels in the region of the friction surfaces of the clutch.

The patent to Macdonald is but one of several publications which propose the utilization of a lockup clutch having friction surfaces which are permitted to slide relative to each other in the disengaged as well as in the engaged condition of the clutch. If a torque converter utilizing a lockup clutch proposed by Macdonald is installed in the power train of a motor vehicle, the slippage of the friction surfaces forming part of the lockup clutch can develop only during relatively short intervals of time (e.g., during shifting into a different gear) or it can be established and maintained at least substantially within the entire operating range of the torque converter. The extent and the duration of slip can be dependent upon the design of the prime mover which transmits torque to the housing of the torque converter and/or upon the selected gear ratio and/or upon one or more variable parameters of the prime mover. The lockup clutch dissipates energy in the form of heat during slippage of the friction surfaces with respect to one another, and the quantity of dissipated energy can be rather pronounced (e.g., in the range of several kilowatts) during certain stages of operation of the torque converter. Such circumstances can arise, for example, when a motor vehicle pulling a trailer is driven along a mountain road, and this can involve the dissipation of substantial amounts of energy for extended intervals of time. Furthermore, when the slip clutch is engaged, the amount of dissipated energy is likely to be greatly increased, at least for a relatively short interval of time, i.e., the lockup clutch and the torque converter are likely to be heated well above a permissible maximum temperature.

The purpose of the establishment of one or more paths for the flow of a fluid coolant (such as oil) is to prevent the aforediscussed drawbacks of presently known torque converters and their lockup clutches. A drawback of heretofore known undertakings to cool the torque converter in the region of its lockup clutch is that the rate of fluid flow along the friction surfaces of the lockup clutch is overly dependent upon the temperature and/or viscosity of the fluid and/or upon the differential between the fluid pressures at the opposite sides of the piston. In other words, if a torque converter and its lockup clutch are constructed and assembled in a manner as proposed, for example, in the aforediscussed patent to Macdonald, the resistance to the flow of the fluid in the channels between the two fluid-containing compartments must the selected in such a way that it is satisfactory under critical circumstances, namely the rate of flow of a fluid whose temperature has risen to a maximum possible or permissible value is less than the rate at which the system pressure in the torque converter would collapse or would drop to an unacceptably low value. In the torque converter which is proposed by Macdonald, the rate of fluid flow in the channels between the two compartments at the opposite sides of the piston of the lockup clutch is directly dependent upon the difference between the fluid pressures in the two compartments. Such pressure differential is that variable parameter which controls the transmission of torque by the lockup clutch and, therefore, it cannot be utilized or relied upon for the selection of the desired volumetric flow of the fluid. Therefore, and in order to maintain the losses in the torque converter above a minimum acceptable value, the rate of fluid flow must be low or relatively low even when the difference between the fluid pressures in the two compartments rises to a maximum value, namely when the torque converter is expected to transmit a maximal torque. This may ensure a satisfactory rate of flow of the fluid coolant when the converter is expected to transmit a maximal torque, but is unsatisfactory during transmission of lesser torque because the difference between the fluid pressures in the two compartments in the housing of the torque converter is too low.

OBJECTS OF THE INVENTION

An object of the present invention is to provide a novel and improved hydrokinetic torque converter.

Another object of the invention is to provide a novel and improved lockup clutch for use in hydrokinetic torque converters.

A further object of the invention is to provide a novel and improved combination of a torque converter and lockup clutch.

An additional object of the invention is to provide a power train which embodies the improved torque converter.

Still another object of the invention is to provide a vehicle which embodies the improved torque converter and/or the improved lockup clutch.

A further object of the invention is to improve the system which cools the parts of a lockup clutch in a hydrokinetic torque converter.

Another object of the invention is to provide improved heat withdrawing action of the fluid coolant which flows between the two compartments in the housing of a torque converter.

An additional object of the invention is to provide a hydrokinetic torque converter with novel and improved means for regulating the exchange of heat between a fluid coolant and the constituents of the lockup clutch.

Still another object of the invention is to provide a torque converter with novel and improved means for regulating the magnitude of the torque which can be transmitted by its lockup clutch and to thus regulate the slip between the friction surfaces of the clutch.

A further object of the invention is to provide a lockup clutch which can more reliably take up fluctuations of torque that develop in the power train between the prime mover (such as a combustion engine) and one or more driven units (e.g., the wheels of a motor vehicle).

Another object of the invention is to enhance the comfort to the occupant or occupants of a motor vehicle embodying a power train which includes the improved torque converter and/or lockup clutch.

An additional object of the invention is to provide a simple and inexpensive, but efficient and versatile, torque converter and a novel and improved lockup clutch therefor.

Still another object of the invention is to provide a novel and improved friction lining and a novel and improved piston for use in the above-outlined lockup clutch.

SUMMARY OF THE INVENTION

The invention is embodied in a hydrokinetic torque converter which comprises a housing having a fluid-containing chamber and being rotatable about a predetermined axis (e.g., by a rotary output element of a prime mover such as the combustion engine of a motor vehicle), a turbine in the housing, a pump in the housing, a stator in the housing, and an engageable and disengageable lockup clutch or bypass clutch which is interposed between the housing and the turbine. The lockup clutch comprises a piston (such as an annular piston made of metallic sheet material) which is movable in the chamber in the direction of the predetermined axis and divides the chamber into a first compartment and a second compartment. The pressure of fluid in the second compartment varies when the torque converter is in use and the lockup clutch further comprises at least one first friction surface which is carried by the piston and at least one second friction surface which is carried by a component sharing the rotary movements of the housing (such component can be of one piece with the housing). The friction surfaces confront each other and are in engagement with one another in the engaged condition of the lockup clutch. The first compartment is disposed at a first radial distance from the predetermined axis and the friction surfaces are disposed at a greater second radial distance from such axis. The piston and/or the rotary component has at least one passage for the flow of fluid from the second compartment toward the first compartment along the friction surfaces in the engaged condition of the lockup clutch. Furthermore, the piston and/or the rotary component is elastically deformable in the region of the at least one passage and the at least one passage is configurated and dimensioned in such a way that it permits variations of the rate of fluid flow therein depending on the variable fluid pressure in the second compartment and the elastic deformability of the piston and/or the rotary component.

The at least one passage can be defined by a channel which is provided in at least one of the confronting friction surfaces. The piston and/or the rotary component can include or can carry a friction lining, and the respective friction surface is then provided on the friction lining. The at least one passage is preferably defined, at least in part, by a channel in the friction surface of the friction lining.

At least a portion of the at least one passage extends substantially radially of the predetermined axis, and the cross-sectional area of such passage preferably varies radially of such axis. The cross-sectional area of the passage can decrease in a direction toward the predetermined axis. Furthermore, the at least one passage can extend across the friction surfaces substantially radially of the predetermined axis and can slope outwardly in the direction of rotation of the housing of the torque converter. Such at least one passage can have an arcuate shape.

The inlet of the at least one passage is disposed at a greater radial distance from the predetermined axis than the outlet of such passage, and the width of the at least one passage can decrease in a direction from the inlet toward the outlet.

The depth of the at least one passage can be at least substantially constant; such depth can be within the range of between 0.1 mm and 0.4 mm.

The pressure of fluid in the second compartment differs from the fluid pressure in the first compartment when the torque converter is in use, and the effective cross-sectional area of the at least one passage can be selected in such a way that it varies as a function of the difference between the fluid pressures in the two compartments. The effective cross-sectional area of the at least one passage can decrease in response to increasing difference between the fluid pressures in the two compartments.

The configuration and the dimensions of the at least one passage and the deformability of the piston and/or the rotary component can be selected in such a way that the rate of fluid flow from the second compartment toward the first compartment differs from the square root of the difference between the fluid pressures in the two compartments. For example, the configuration and the dimensions of the at least one passage can be related to the deformability of the piston and/or the rotary component in such a way that the rate of fluid flow in the at least one passage is at least substantially constant within a major part of the operating range of the torque converter.

The first compartment can be disposed between a wall of the housing (such wall can include or constitute the aforementioned rotary component) and the piston, as seen in the direction of the predetermined axis. The wall of the housing preferably extends substantially radially of the predetermined axis, and the piston can be disposed between such wall and the turbine.

The aforementioned friction lining can be provided on the piston and/or on the rotary component, and the lockup clutch can be provided with a plurality of passages each of which can include a channel in the friction surface of the friction lining that forms part of or is bonded to the piston and/or in the friction surface of the friction lining that forms part of or is bonded to the rotary component.

The lockup clutch is or can be constructed in such a way that the piston is made, at least in part, of an elastically or resiliently deformable material.

At least one of the friction surfaces is or can be a frustoconical surface. Such frustoconical surface can make an angle of between approximately 174° and 179° with a plane which is normal to the predetermined axis.

The piston can include a frustoconical portion which is disposed at the same radial distance from the predetermined axis as the friction surfaces of the lockup clutch, and such frustoconical portion of the piston can make an angle of between about 174° and 179° with a plane which is normal to the predetermined axis.

BRIEF DESCRIPTION OF THE DRAWINGS

The novel features which are considered as characteristic of the invention are set forth in the appended claims. The improved hydrokinetic torque converter itself, however, both as to its construction and its mode of operation, together with additional features and advantages thereof and the features and advantages of its lockup clutch, will be best understood upon review of the following detailed description of certain presently preferred specific embodiments with reference to the accompanying drawings, wherein:

FIG. 6 shows a modification of the friction lining of FIG. 2.

DESCRIPTION OF PREFERRED EMBODIMENTS

Figure 1:
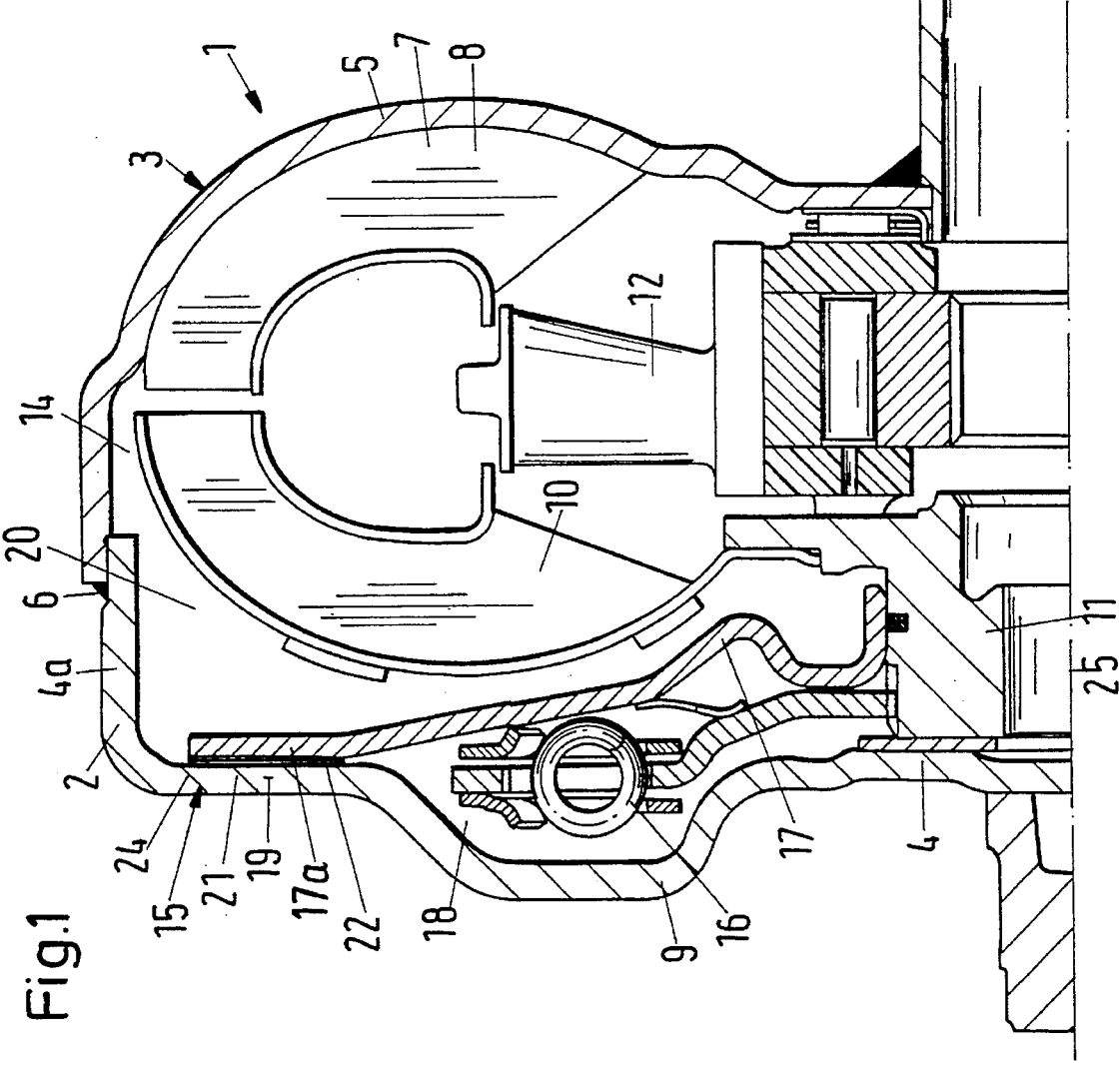
FIG. 1 is a fragmentary axial sectional view of a hydrokinetic torque converter with a lockup clutch which embodies one form of the invention.

FIG. 1 shows a portion of an apparatus 1 which can be installed in the power train between the prime mover (such as an internal combustion engine) and one or more driven units (e.g., an automatic transmission) in a motor vehicle. The apparatus 1 comprises a hydrokinetic torque converter 3 having a composite housing 2 defining an internal chamber 14 for a pump 7, a turbine 10, stator 12 and an engageable and disengageable lockup clutch or bypass clutch 15 which can establish a direct torque transmitting connection between the housing 2 and the hub 11 of the turbine 10. The housing 2 includes a first cupped section 4 which can receive torque from the output element of a prime mover to rotate about an axis 25, and a second cupped section 5 having an tubular sleeve-like hub 13 which can be rotatably and sealingly installed in the case of a transmission. Reference may be had, for example, to FIG. 1 of U.S. Pat. No. 4,493,406 granted Jan. 15, 1985 to Bopp for "Viscous Bypass Coupling For Torque Converter" which shows a torque converter between the rotary output element of an internal combustion engine and the input element of a gear ratio box. The disclosure of this patent is incorporated herein by reference.

Instead of being directly driven by the output element (such as a crankshaft or a camshaft) of a prime mover, the section 4 of the housing 2 can be provided with a plate-like intermediate member which is affixed to its substantially radially extending wall 9 and to the output element. Reference may be had, for example, to the published Japanese patent application Serial No. 58-30532 which shows a plate-like intermediate member having a radially outer portion affixed to the housing of a torque converter and a radially inner portion affixed to the output element of a prime mover.

The radially outer portion 4a of the housing section 4 is a relatively short cylinder which is telescoped into a relatively short radially outer cylindrical portion of the housing section 5. The latter is sealingly bonded to the portion 4a of the section 4 by a welded seam 6.

The radially extending portion of the housing section 5 forms part of the pump 7 and its internal surface is affixed to a set of pump vanes or blades 8. The turbine 10 is disposed in the internal chamber 14 of the housing 2 between the radially extending wall 9 of the section 4 and the pump 7. The radially inner portions of the pump 7 and turbine 10 flank the stator 12. The hub 11 is of one piece with or is affixed to the turbine 10 and its internal surface is provided with alternating axially parallel splines and teeth arranged to mesh with the external teeth of the input element of a driven unit which is to receive torque from the turbine 10.

The lockup clutch 15 is installed in the chamber 14 between the turbine 10 and the wall 9 of the housing 2 and includes an annular piston or pressure plate 17 which is movable along the periphery of the hub 11 in the direction of the axis 25. The clutch 15 is constructed and assembled to operate in parallel with those parts of the torque converter 3 which include the stator 12, the turbine 10, the pump 7 and the housing 2. When engaged, the clutch 15 transmits torque directly from the wall 9 of the housing section 4 to a damper 16 on the hub 11 of the turbine 10.

The lockup clutch 15 operates in series with the damper 16 which comprises a set of circumferentially extending energy storing elements in the form of coil springs. The piston 17 constitutes or includes an input member of the damper 16, and the output member of this damper is non-rotatably but axially movably secured to the hub 11 of the turbine 10.

The piston 17 of the clutch 15 divides the internal chamber 14 of the housing 2 into a first compartment 18 located radially inwardly of two friction surfaces 21, 22a of the clutch and a second compartment 20 which accommodates the turbine 10, the vanes 8 of the pump 7 and the stator 12. That part of the clutch 1 which includes the two confronting friction surfaces 21, 22a is denoted by the reference character 19.

The friction surface 21 of the illustrated lockup clutch 15 is provided at the inner side of a substantially radially extending portion of the wall 9. The piston carries a friction lining 22, and the friction surface 22a is provided on such friction lining. That portion of the piston 17 which carries the friction lining 22 is denoted by the character 17a.

It is already known to operate a torque converter which is installed in the power train between a prime mover and one or more driven units in such a way that the lockup clutch is operated with slippage during a major part of the range of operation of the torque converter. This entails losses of energy because the parts which are adjacent the friction surfaces of the lockup clutch are heated due to angular movement of the abutting friction surfaces relative to each other. Under certain circumstances, the losses of energy are quite considerable and can amount to several kilowatts. By way of example, the lockup clutch of a torque converter can generate large amounts of heat when a motor vehicle which is coupled to a trailer is driven along a mountain road. Substantial amounts of heat are generated also during transition from the operation of a torque converter with the lockup clutch disengaged to operation with the clutch practically engaged. Torque converters having lockup clutches which operate with slip are disclosed, for example, in German patent applications Nos. P 42 28 137.7-12 and P 42 35 070.0-12. Reference may be had also to U.S. Pat. No. 4,969,543 to Macdonald.

In order to avoid the development of excessive amounts of heat in the part 19 of the wall 9, in the friction lining 22 and in the portion 23 of the piston 17, the lockup clutch 15 is provided with at least one, but preferably two or more, passages 24 which establish paths for the flow of fluid coolant from the compartment 20, along the friction surfaces 21 and 22a, and into the compartment 18. Such cooling of the lockup clutch 15 in the region of its friction surfaces not only prolongs the useful life of the friction lining 22 but also greatly reduces the likelihood of spoilage of some of the fluid in the internal chamber 14 of the housing 2. In many instances, the fluid coolant is oil and the passages 24 are configurated and dimensioned to permit the fluid to flow from the compartment 20, radially inwardly through the passages and hence into the compartment 18 even in the practically fully engaged condition of the lockup clutch. The flow of fluid in the passages is continuous and suffices to ensure a highly satisfactory exchange of heat between the conveyed fluid and those parts of the lockup clutch which are adjacent the friction surfaces 21 and 22a. This is achieved by imparting to the passages 24 a novel configuration as well as by selecting the material of the parts which are adjacent the friction surfaces with a view to ensure that at least one of these parts exhibits certain desirable characteristics which render it possible to regulate the rate of fluid flow in the passages as a function of certain operational parameters, for example, the pressure differential between the fluid in the compartment 18 and the fluid in the compartment 20.

Figure 2:
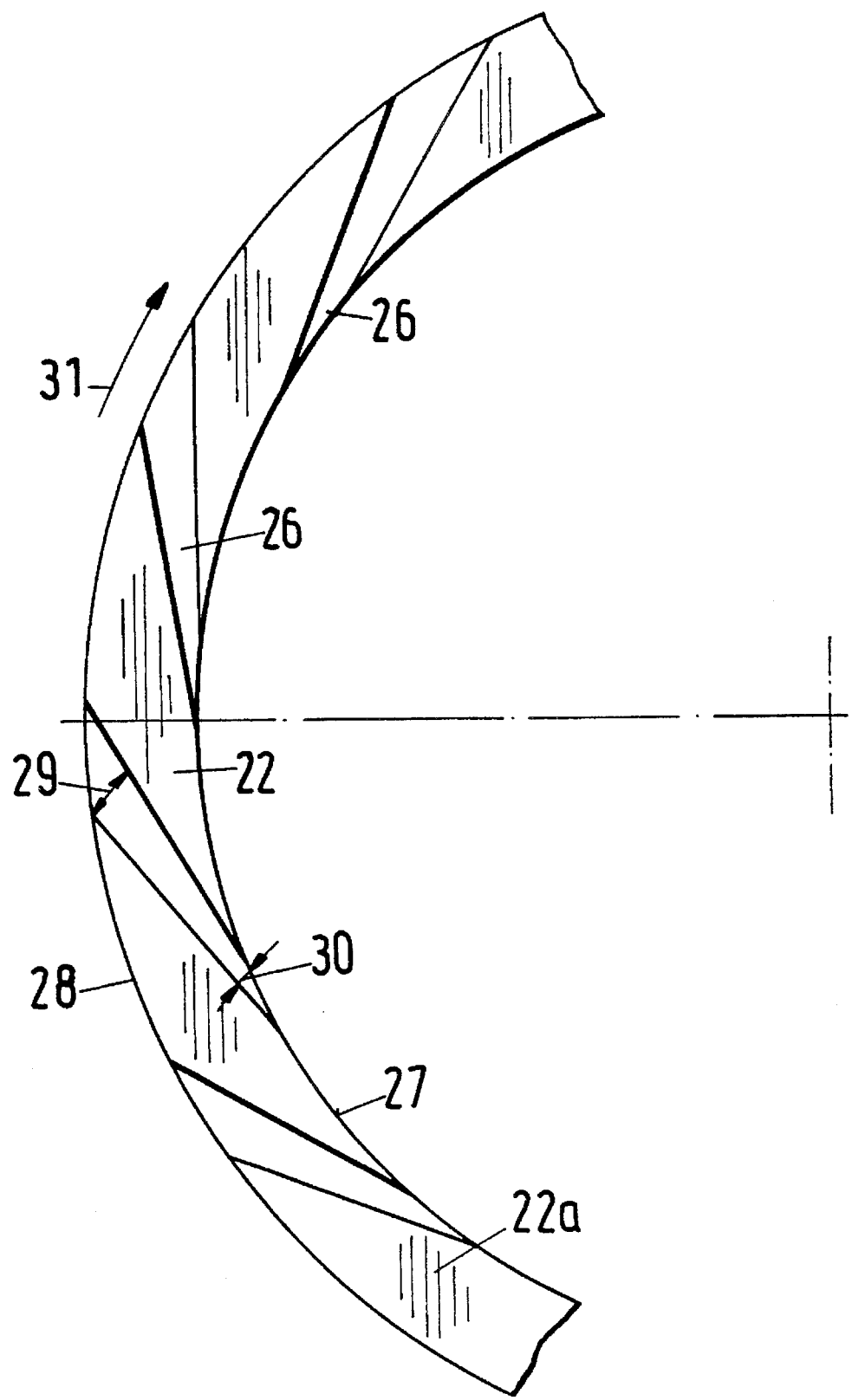
FIG. 2 is a fragmentary plan view of the friction surface on a friction lining which can be affixed to the piston of the lockup clutch or to the housing of the torque converter.

One presently preferred form of passages will be described with reference to FIGS. 2, 3 and 4. FIG. 2 shows that the passages 24 include or constitute channels or grooves 26 which are impressed into or otherwise formed in the friction surface 22a of the friction lining 22. The relatively wide inlets 29 of the channels 26 are provided in the radially outer marginal portion 28 of the friction lining 22, and the relatively narrow outlets 30 of such channels are provided in the radially inner marginal portion 27 of the friction lining. The inlets 29 receive fluid from the compartment 20, and the outlets 30 discharge fluid toward or into the compartment 18. The latter contains the damper 16 and is disposed between the wall 9 of the housing section 4 and the piston 17 of the lockup clutch 15. The flow of fluid from the compartment 20 into the compartment 18 is throttled because the width of each channel 26 decreases at least substantially gradually all the way from the respective inlet 29 to the respective outlet 30. At least some fluid can flow in the passages 24 even when the lockup clutch 15 is fully engaged, i.e., when the friction surface 22a bears upon the friction surface 21 of the wall 9. The fluid which enters the compartment 18 flows at least substantially radially inwardly toward the axis 25 of the housing 2 and its sections 4 and 5. The radially inwardly flowing heated fluid can be evacuated from the compartment 18 in the region of the hub 11 of the turbine 10, for example, through one or more conduits or bores in the hub 11. The evacuated fluid is preferably caused to exchange heat with another fluid in a suitable heat exchanger and is thereupon admitted into a sump. The latter serves as a source of supply of cooled or regenerated fluid for admission into the compartment 20.

The channels 26 in the friction surface 22a of the friction lining 22 which is shown in FIG. 2 are equidistant from each other in the circumferential direction of the friction lining, and each such channel slopes radially outwardly from its outlet 30 toward its inlet 29 in the direction of rotation (arrow 31) of the housing 2 of the torque converter 3 when the housing receives torque from a prime mover. Each channel may but need not have an arcuate shape and the body of fluid therein can be said to resemble a flat wedge or can have an outline resembling that of a trumpet.

Reference may be had to FIG. 6 which shows a portion of a friction lining 22' having an arcuate channel 26'.

It is to be understood that the configuration of the passages 24 and their channels 26 which are shown in FIG. 2 is but one of a number of suitable configurations which can be resorted to with equal or similar advantage. For example, the width of the channels 26 need not increase gradually all the way from the outlets 30 to the inlets 29 of the respective passages 24. Furthermore, though the illustrated passages 24 are assumed to have a uniform depth all the way between the inner and outer marginal portions 27, 28 of the friction lining 22, it is also possible to provide the friction lining with channels whose depth increases (gradually or otherwise) at least part of the way between the respective inlets and outlets or vice versa. All of the proposed novel configurations of the passages share the feature that the cross-sectional areas of at least some passages vary intermediate the inlets and outlets of the respective channels.

The width of the inlets 29 of the channels 26 which are shown in FIG. 2 can be in the range of between 5 mm and 15 mm, depending upon the number of passages 24. The width of the outlets 30 can vary between 1 mm and 5 mm, again depending upon the number of passages 24. Furthermore, the width of the inlets 29 and/or the outlets 30 will depend, at least to a certain extent, on the configuration of the channels 26 between the marginal portions 27 and 28 of the friction lining 22.

The depth of the channels 26 can vary between 0.1 and 1 mm. It has been found that a highly satisfactory depth is somewhere between about 0.1 mm and 0.4 mm. The depth of the channels 26 can be constant all the way between the inlets 29 and the outlets 30 of the respective passages 24. However, it is also possible to provide the friction surface 22a of the friction lining 22 with channels 26 having a depth which varies between the inlet and the outlet of the respective passage or in the direction of rotation of the friction lining when the torque converter embodying a lockup clutch 15 of the type shown in FIGS. 1 to 4 is in actual use.

Figure 3:
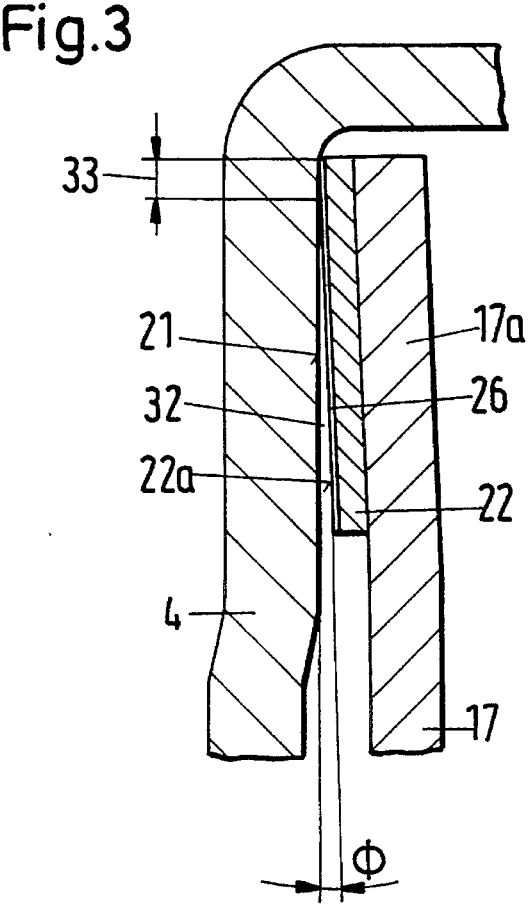
FIG. 3 is an enlarged view of a detail of the structure of FIG. 1 in the disengaged or partly engaged condition of the lockup clutch.
Figure 4:
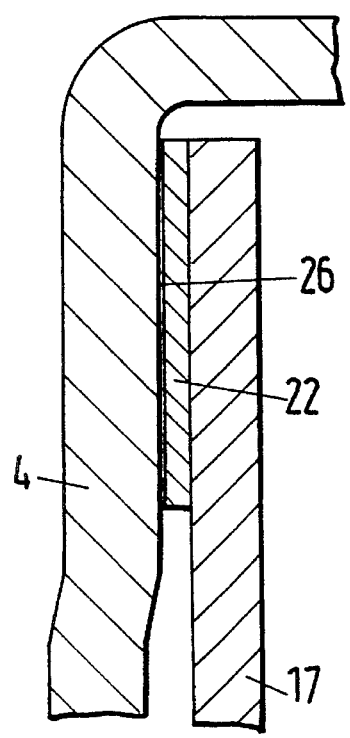
FIG. 4 illustrates the structure of FIG. 3 but with the piston shown in a position when the lockup clutch is engaged.

FIGS. 3 and 4 show the part 19 of the lockup clutch 15 drawn to a larger scale. For the convenience of illustration, the single channels 26 which are shown therein are assumed to extent exactly or substantially radially of the axis 25 of the housing including the section 4. The piston 17 is elastically deformable and, when unstressed or practically unstressed, its frustoconical portion 17a assumes the position which is shown in FIG. 3, i.e., the width 33 of the region of contact between the radially, outer portions of the friction surfaces 21 and 22a is a relatively small fraction of the full width (as measured radially of the axis 25) of the friction lining 22. The pressure of fluid in the compartment 18 matches or very closely approximates the pressure of fluid in the compartment 20, i.e., the inclination of the frustoconical piston portion 17a is not affected, or is not appreciably affected, by the pressure of fluid filling the compartments 18 and 20. The major parts of the friction surfaces 21 and 22a are out of contact with one another, and the non-contacting portions of these friction surfaces make an angle $\phi$ in the range of between 0.5° and 3°, normally close to 1°. The wedge like radially extending clearance between the non-contacting portions of the friction surfaces 21 and 22a is shown at 32. The width of such clearance (as seen in the direction of the axis 25) increases in a direction from the outer marginal portion 28 toward the inner marginal portion 27 of the friction lining 22.

FIG. 4 shows the inclination of the piston portion 17a relative to the friction surface 21 on the radially extending wall of the housing section 4 when the difference between the fluid pressures in the compartments 18 and 20 reaches a predetermined value. At such time, the pressure of fluid in the compartment 20 exceeds the pressure of fluid in the compartment 18 and, therefore, the angle $\phi$ between the friction surfaces 21 and 22a is reduced to zero or practically to zero. In other words, the friction surfaces 21 and 22a contact each other along the full width (or practically along the full width) of the friction lining 22. The predetermined differential between the fluid pressures in the compartments 18 and 20 can be in the range of between about 4 and 7 bar. The resiliency of the material of the piston portion 17a will be selected depending upon the desired pressure differential which must be established between the fluids filling the compartments 18 and 20 when the piston portion 17a is to assume the position which is shown in FIG. 4. This can be achieved by properly selecting the thickness of the piston portion 17a and/or the deformability of such piston portion. For example, the piston portion 17a can be reinforced by suitably distributed stiffening ribs (not specifically shown) in order to ensure that it will resist the pressure differential up to a particular value and to thereupon assume the inclination which is shown in FIG. 4 as soon as the pressure differential reaches or exceeds the preselected value. The configuration of the piston 17 can be such that the piston portion 17a and the piston portion which is disposed radially inwardly of the portion 17a constitute two leaves of an imaginary hinge which enables the portion 17a to change its inclination relative to the remaining portion of the piston about a circular fulcrum including that part of the piston 17 which connects the portion 17a to the portion located radially inwardly of the portion 17a. The piston 17 can be said to act not unlike a resilient membrane which can yield in the direction of the axis 25 when the pressure differential between the fluids in the compartments 18 and 20 reaches a given value.

FIGS. 3 and 4 show that, when the pressure differential between the fluids in the compartments 18 and 20 is zero or does not appreciably exceed zero, the width of the annular region 33 of contact between the friction surfaces 21 and 22a is a small fraction of the full width of the friction lining 22 (as measured in a direction radially of the axis 25) and that the region 33 is disposed between the radially outermost portions of the two friction surfaces. At such time, the rate of fluid flow from the compartment 20 into the compartment 18 is relatively high because the relatively wide inlets 29 of the passages 24 can admit fluid from the compartment 20 directly into the annular clearance 32 between the non-contacting portions of the friction surfaces 21 and 22a. Thus, and assuming that the pressure differential between the compartments 18, 20 is about 1 bar, the friction surfaces 21, 22a can readily slip relative to each other and the cooling action of the fluid flowing from the compartment 20 into the compartment 18 is highly satisfactory because the fluid can withdraw substantial amounts of heat from the entire part 19 of the lockup clutch 15, i.e., from that portion of the wall 9 which is provided with the friction surface 21, from the friction lining 22 and from the piston portion 17a. This ensures that the thermal stressing of those parts of the lockup clutch 15 which carry the friction surfaces 21 and 22a is within an acceptable range as well as that the fluid (normally oil) flowing from the compartment 20 into the compartment 18 is not overheated.

As the pressure in the compartment 20 continues to rise above the pressure in the compartment 18, the inclination (conicity) of the piston portion 17a relative to the adjacent portion of the housing section 4 begins to decrease to assume the inclination which is shown in FIG. 4 not later than when the pressure differential between the compartments 20 and 18 rises to or above a predetermined value. This results in a corresponding widening of the area of direct contact between the friction surfaces 21 and 22a, i.e., the angle $\phi$ is reduced to zero or at least close to zero. This, in turn, entails a reduction of the rate of flow of fluid from the compartment 20 toward the compartment 18, i.e., the friction lining 22 cooperates with the adjacent portion of the housing section 4 to act not unlike an adjustable throttle valve. The fluid throttling action of the surfaces bounding the channels 26 in the friction lining 22 and of the adjacent portions of the friction surface 21 then reaches a maximum value, i.e., the effective combined cross-sectional area of the paths for the flow of fluid coolant between the housing section 4 and the friction lining 22 is then reduced to a minimum.

It is often preferred to select the configuration of the surfaces bounding the channels 26 in the friction lining 22 in such a way that the quantity of fluid flowing from the compartment 20 into the compartment 18 remains at least substantially constant even though the throttling action of the parts 4 and 22 upon the flowing fluid (i.e., the reduction of the effective cross-sectional area of the paths for the flow of fluid from the compartment 20) progresses in response to rising pressure differential in the compartments 18 and 20. Such a selection of the rate of fluid flow from the compartment 20 into the compartment 18 is preferably maintained at least within a major part of the operating range of the torque converter 3. Alternatively, the configuration of the surfaces bounding the channels 26 can be selected with a view to ensure that the actual increase of the quantity of fluid flowing between the compartments 20 and 18 is less pronounced than would be expected in response to a rise of fluid pressure in the compartment 20.

Otherwise stated, the configuration of the surfaces bounding the channels 26 in the friction surface 22a can be such that the quantity of fluid flowing from the compartment 20 into the compartment 18 per unit of time will not exceed a preselected value even if the pressure differential reaches a predetermined maximum value. At the same time, the passages 24 permit a relatively large quantity of fluid to flow from the compartment 20 into the compartment 18 per unit of time when the fluid pressure in the compartment 20 is only slightly higher than the fluid pressure in the compartment 18, e.g., when the conicity of the friction surface 22a matches or approximates that which is shown in FIG. 3.

It will be seen that the resistance to the flow of fluid coolant from the compartment 20 into the compartment 18 can be regulated by configurating the channels 26 in the friction lining 22 in such a way that their cross-sectional area varies in a direction substantially radially of the axis 25, i.e., in a direction from the radially outer marginal portion 28 toward the radially inner marginal portion 27 of the friction lining 22. The effective cross-sectional area of all paths for the flow of fluid from the compartment 20 into the compartment 18 varies depending on the momentary conicity of the friction lining 22, i.e., depending upon the then prevailing differential between the fluid pressures in the compartments 18 and 20.

It is further desirable to ensure the establishment of a turbulent flow of fluid along the paths which lead from the compartment 20 toward the compartment 18. This can be achieved by resorting to the aforediscussed configuration and dimensioning of the surfaces bounding the channels 26 in the friction surface 22a. The development of turbulent flow contributes to the heat withdrawing action of the fluid coolant. The arrangement can be such that the turbulent flow develops at the inlets 29 of the passages 24, at the outlets 30 of the passages 24 or all the way from the inlet to the outlet of each passage.

The maximum pressure differential between the fluids in the compartments 18 and 20 can be selected in such a way that, at least when the pressure differential reaches a maximum permissible value, the deformation of the piston portion 17a progresses beyond that which is shown in FIG. 4, i.e., an annular clearance develops between the radially outer portions of the friction surfaces 21 and 22 and its width tapers radially inwardly toward the compartment 18. Otherwise stated, the region of actual contact between the friction surfaces 21 and 22a initially increases in a direction from the radially outer marginal portion 28 toward the radially inner marginal portion 27 of the friction lining 22 to thereupon decrease in a direction from the radially outer portion 28 toward the radially inner portion 27. The rate of fluid flow between the compartments 18 and 20 at a pressure differential which matches or exceeds the aforementioned predetermined value is then determined by the width of the area of contact between the friction lining 22 and the housing section 4 in the region of the radially inner marginal portion 27 of the friction lining. Again, the quantity of fluid which flows into the compartment 18 is a function of the dimensions (such as the length and the configuration of those portions of the friction surface 22 which are adjacent to the radially inner marginal portion 27) of the overlapped portions of the channels 26 which are sealed by the adjacent portions of the friction surface 21.

The illustrated embodiment of the lockup clutch 15 is provided with passages 24 which include grooves 26 impressed into or otherwise formed in the friction surface 22a of the friction lining 22 on the normally frustoconical portion 17a of the piston. However, it is equally within the scope of the invention to bond the friction lining 22 or a similar friction lining to the housing section 4 and to provide the piston portion 17a with a friction surface corresponding to the friction surface 21. Still further, it is possible to provide the passages 24 or analogous passages directly in the friction surface 21 of the housing section 4 and to then utilize a friction lining which does not have any channels 26. It is also possible to bond an unchanneled friction lining to the housing section 4 and to provide the passages 26 directly in the piston portion 17a. It is further possible to provide channels 26 in the friction surface 22a of a friction lining 22 which is bonded to the piston portion 17a and to provide additional channels directly in the friction surface 21 of the housing section 4.

The illustrated lockup clutch 15 (having a single pressure plate or piston 17 and a single counterpressure plate or housing section 4) can be replaced with a clutch having one or more discs or laminations between the piston 17 and the housing section 4. The number of pairs of cooperating friction surfaces then exceeds one and one friction surface of each pair can be provided on a friction lining.

The purpose and the advantages of the aforediscussed passages 24 and of the respective channels or grooves 26 will be described with reference to the diagram of FIG. 5. Various pressure differentials P/bar between the fluids in the compartments 18 and 20 are measured along the abscissa and the magnitude of the angle φ is measured along the right-hand ordinate. The quantities of fluid (V in liters per minute) are measured along the median ordinate, and the width B of the region of contact 33 between the friction surfaces 21, 22a is measured (in mm) along the left-hand ordinate. It is assumed that the full width of the friction surface 22a (as measured radially of the axis 25 of the housing 2) is approximately 19 mm.

It is further assumed that the angle φ equals or approximates 0.5° when the pressure differential between the fluids in the compartments 18, 20 equals or approximates one bar. The magnitude of the angle φ decreases in response to an increase in the pressure differential, and the friction surfaces 21 and 22a lie flush against each other when the pressure differential rises to 3 bar. Thus, when the positions of the friction surfaces 21 and 22a correspond to those shown in FIG. 4, the magnitude of the angle φ equals or at least closely approximates zero. If the pressure in the compartment 20 continues to rise above the pressure in the compartment 18, the conicity of the friction surface 22a begins to increase but in a sense to establish an angle φ having an apex at or close to the radially inner marginal portion 27 of the friction lining 22. In other words, the thus developed annular clearance has a maximum width at the radially outer marginal portion 28 of the friction lining 22 and such width decreases radially inwardly toward the axis 25 of the housing 2. All this is indicated by the curve A in the diagram of FIG. 5.

The curve B indicates that the width (33) of the area of contact between the friction surfaces 21 and 22a increases in response to increasing pressure differential between the bodies of fluid coolant in the compartments 18 and 20 to thereupon decrease when the magnitude of the angle φ begins to increase from 0°. In other words, the width 33 of the area of contact first increases from a value matching or approximating that shown in FIG. 3 to a maximum value corresponding to that shown in FIG. 4 to thereupon decrease in the opposite direction, i.e., the radially outer marginal portion 28 of the friction lining 22a begins to move axially of the housing 2 in that the piston portion 17a pivots clockwise (as seen in FIG. 4) to establish an annular clearance having a wedge-shaped cross-sectional outline and having its apex at the radially inner marginal portion 27 of the friction lining 22. The angle φ which develops when the radially outer marginal portion 28 of the friction lining 22 completes its movement away from the radially outer portion of the friction lining 21 on the housing section 4 is not or need not be proportional to the angle φ which is shown in FIG. 3. In other words, and contrary to the mutual inclination of the friction surfaces 21 and 22a as shown in FIG. 3 for the sake of simplicity, the friction surface 22a need not and normally does not constitute a perfect frustoconical surface because the friction lining 22 will bend or can be flexed about a fulcrum which is located at the radially innermost portion of the area (33) of contact between the friction surfaces 21 and 22a. Thus, the friction surface 22a then includes a radially outer portion which lies flush against the radially outer portion of the friction surface 21 and a frustoconical portion (or a more pronounced frustoconical portion) radially inwardly of the area 33. Analogously, the friction surface 22a will include a radially inner portion lying flush against the adjacent portion of the friction surface 21 and a frustoconical radially outer portion which diverges radially outwardly and away from the radially outer portion of the friction surface 21. The just-described establishment of two mutually inclined portions of the friction surface 22a will develop as a result of elastic deformability of the friction lining 22 or of the friction lining and the piston portion 17a.

Figure 5:
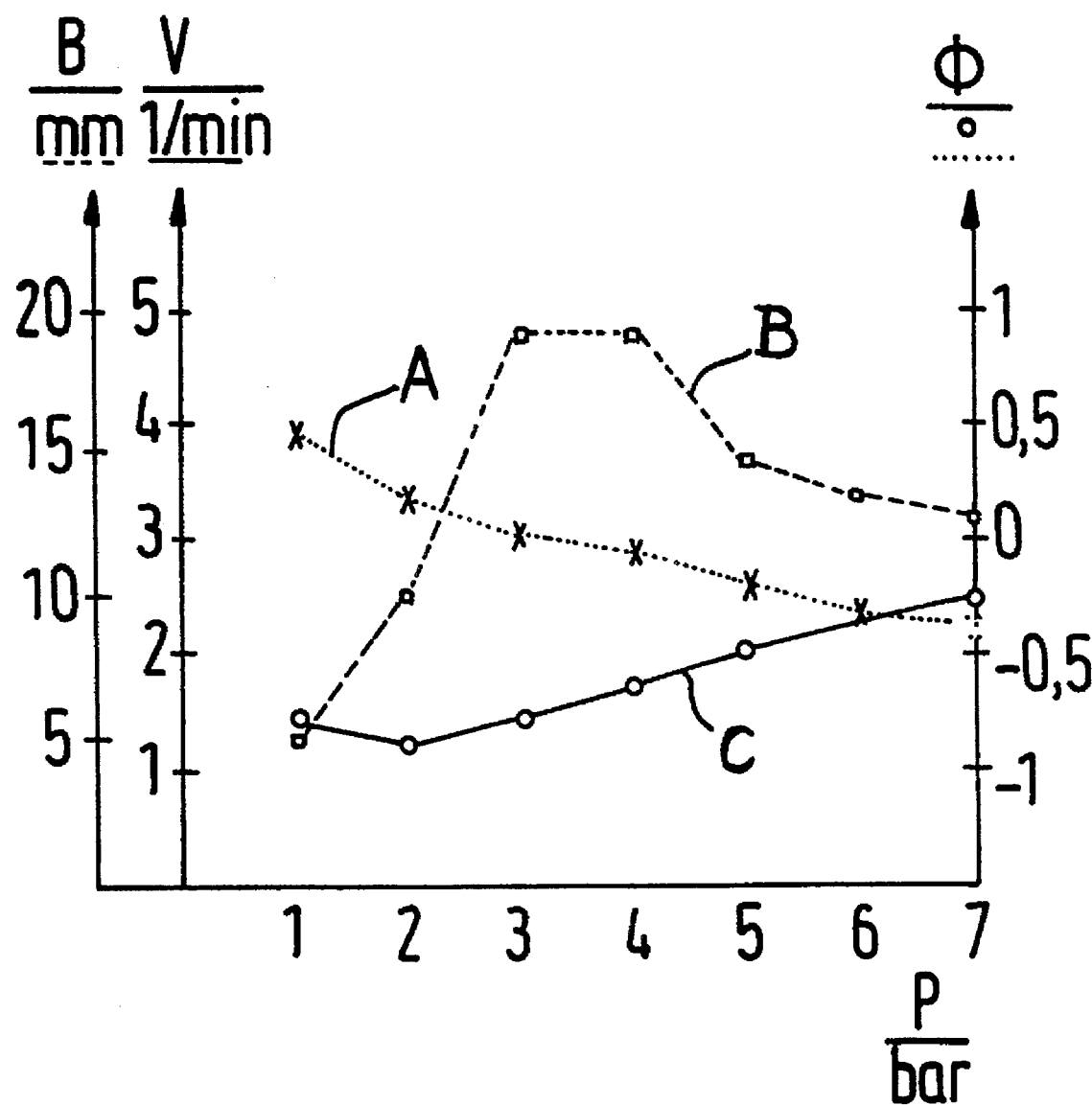
FIG. 5 is a diagram wherein the curves denote the relationship of the pressure in the second compartment, the inclination of one of the friction surfaces, the rate of fluid flow between the two compartments and the width of the contacting portions of the two friction surfaces with respect to each other.

The curve C of FIG. 5 shows that the quantity of fluid flowing from the compartment 20 into the compartment 18 can be in the range of between 1.3 and 1.4 liters per minute when the pressure differential between the bodies of fluid in the two compartments is relatively low, e.g., when such pressure differential is in the range of between about 1 bar and 2 bar. If the pressure differential rises to approximately 7 bar, the quantity of fluid flowing from the compartment 20 toward the compartment 18 is increased to approximately 2.5 liters per minute. The curve C further indicates that the rate of fluid flow through the passages 24 is not proportional to the square root of the pressure differential between the bodies of fluid in the compartments 18 and 20.

The specific construction and mode of operation of the lockup clutch 15 as described with reference to FIGS. 2 to 5 is but one of numerous embodiments of the present invention. Thus, and as already mentioned above, the configuration and/or the dimensions and/or the number and/or the orientation and/or the positions of the passages can be varied in a number of ways without departing from the spirit of the present invention. The same applies for the materials and/or the configuration of the friction lining 22, housing section 4 in the region of the friction surface 21 and/or the piston 17 and its portion 17a. It is desirable and important to ensure that the dimensions, the number, the orientation and the distribution of the passages 24 be selected with a view to ensure that the resistance to the flow of fluid therein is satisfactory even under the most unsatisfactory or critical circumstances of use of the torque converter 3 and its lockup clutch 15. In other words, even if the temperature of the fluid coolant reaches a maximum permissible value, the quantity of fluid flowing from the compartment 20 into the compartment 18 (under any of the contemplated circumstances of use of the torque converter and its lockup clutch) should not exceed that quantity at which the system pressure in the housing 2 of the torque converter would collapse or would be likely to collapse.

Contrary to the rate of fluid flow between the compartments of the torque converter as described with reference to FIG. 5, the passages 24 can be configured, distributed, oriented and dimensioned in such a way that the quantity of fluid flowing from the compartment 20 remains constant or decreases in response to increasing pressure differential between the bodies of fluid in the two compartments. In fact, it is equally possible to design the lockup clutch 15 in such a way that the flow of fluid from the compartment 20 into the compartment 18 is interrupted under certain specific circumstances. This can be achieved by reducing the width of the outlets 30 of the passages 24 to zero so that the thus modified passages permit the fluid to flow from the compartment 20 through the passages 24 and toward the compartment 18 only when the magnitude of the angle φ shown in FIG. 3 exceeds zero so that the fluid can flow from the passages 24 into the clearance 32 and thence toward the compartment 18. At least in many instances, the material of the parts 4, 17 and/or 22 and/or the configuration, the dimensions, the number, the distribution and/or the orientation of the passages 24 will be selected with a view to ensure that the quantity of fluid flowing from the compartment 20 is at least substantially constant. In other words, the quantity of fluid flowing from the compartment 20 should be at least substantially independent of the fluctuations of the fluid pressure at the inlets of the passages 24 or equivalent passages.

A turbulent flow in the passages 24 or analogous passages in the friction lining 22 and/or in the housing section 4 and/or in the piston portion 17a can be achieved by causing the passages to slope from their radially inner outlets toward the respective radially outer inlets in the direction of rotation (arrow 31) of the housing 2 when the torque converter 3 is in use, i.e., when the output element of a prime mover transmits torque to the wall 9 of the housing section 4. Furthermore, and even though a preceding passage of this specification mentions a preferred or highly satisfactory channel depth in the range of between about 0.1 mm and 0.4 mm, the actual depth of an entire channel, or of one or more portions of a channel, can be above or below such range. In addition, and depending upon the nature of the power train in which the torque converter is being put to use and upon the circumstances of actual use, the volume of fluid flowing from the compartment 20 per unit of time need not remain constant or need not increase (as described with reference to the diagram of FIG. 5) but can also decrease. All that counts is to ensure that the configuration, orientation, distribution, dimensions and/or the number of passages 24, as well as the elastic deformability of the housing section 4 and/or the friction lining 22 and/or the piston 17 be selected with a view to ensure that the quantity of fluid flowing from the compartment 20 per unit of time is not proportional to the square root of the difference between the fluid pressures in the compartments 18 and 20. The relationship between the elastic deformability of at least one constituent of the lockup clutch 15 and the aforedescribed characteristics of the passages 24 is preferably such that the quantity of fluid flowing from the compartment 20 into and beyond the passages 24 is at least substantially constant during a major part of the operating range of the torque converter. This does not preclude the aforedescribed possibilities of increasing the volume of fluid flow from the compartment 20 per unit of time when the pressure differential between the fluids in the compartments 18 and 20 reaches or rises above a preselected value or of reducing the volume of fluid flow from the compartment 20 when the pressure differential reaches or exceeds a selected value. Still further, the aforementioned relationship between the characteristics of the passages 24 and the deformability of one or more parts of the lockup clutch 15 can be such that the rate of fluid flow from the compartment 20 increases within a first range of pressure differentials but decreases within a different second range of pressure differentials. The increase of the volume of liquid leaving the compartment 20 can precede the reduction or vice versa.

The friction lining 22 constitutes a desirable and advantageous but still optional feature of the improved lockup clutch 15. Thus, the channels 26 can be machined into or otherwise formed directly in the friction surface 21 and/or directly in the adjacent side of the piston portion 17a. If a friction lining is used, it is preferably adhesively secured (bonded) to the piston portion 17a or to the housing section 4. Though it is also possible to employ a friction lining which is not provided with channels or grooves (such as the channels 26) and to provide the channels in the friction surface 21 or (if the non-channeled friction lining is bonded to the housing section 4) in the adjacent side of the piston portion 17a, the provision of channels 26 exhibits several important advantages. Thus, it is simpler to impress or otherwise form the channels in a friction lining than in the housing of a torque converter or in the piston of a lockup clutch. Moreover, a friction lining can be replaced, if and when necessary, and the lining can yield to a desired extent when the lockup clutch is partially or practically fully engaged. It has been found that the making of channels 26 in the friction lining can ensure highly accurate regulation of the flow of fluid coolant from the compartment 20 toward the compartment 18 during all or nearly all stages of contemplated or anticipated use of the torque converter and its lockup clutch. Furthermore, the provision of channels in the friction lining ensures highly satisfactory cooling of the friction lining as well as of the neighboring parts of the lockup clutch without causing an overheating (and potential spoilage) of the fluid coolant.

It is further possible to configurate the lockup clutch in such a way that the fluid coolant flows along a path extending from the compartment 20 and radially outwardly toward the compartment 18. The illustrated construction (wherein the fluid flows from the compartment 20 radially inwardly or substantially radially inwardly along the friction surfaces and toward the compartment 18) is preferred at this time. Furthermore, and though it is clearly within the spirit of the invention to make the housing section 4 (or at least that part of the housing section 4 which is provided with the friction surface 21) of an elastically deformable material, it is presently preferred to employ an elastically deformable piston.

FIGS. 1, 3 and 4 show a friction lining 22 having a constant thickness all the way between the radially inner marginal portion 27 and the radially outer marginal portion 28. Such friction lining is carried by the piston portion 17a having an at least substantially frustoconical side carrying the friction lining. However, it is also possible to employ a piston 17 having a portion 17a which extends at least substantially radially of the axis 25 of the turbine 10 and to employ a friction lining having a thickness which increases in a direction from the radially outer marginal portion toward the radially inner marginal portion or in the opposite direction. Still further, it is possible to impart to the friction surface 21 a substantially frustoconical shape and to employ a deformable piston and/or a deformable friction lining which can be moved flush against the frustoconical friction surface of the housing section 4 when the pressure differential between the bodies of fluid coolant in the compartments 18 and 20 reaches a preselected value or is within a predetermined range. Moreover, it is possible to employ a housing section 4 having a frustoconical friction surface 21 and to employ a piston provided with a friction lining also having a frustoconical shape. In other words, each of the two friction surfaces can exhibit a certain amount of conicity.

It has been found that the quantity of fluid flowing between the compartments 18 and 20 can be regulated with a highly satisfactory degree of accuracy if the angle between a plane which is exactly normal to the axis 25 of the housing 2 and at least one of the friction surfaces 21, 22a is between approximately 174° and 179° Otherwise stated, the inclination of at least one of the friction surfaces 21, 22a relative to the axis 25 is or should be between about 87° and 89.5°. Expressed in still another way, one of the angles between a line extending radially of the axis 25 and being located in the friction surface 21 or 22a and a plane which is normal to the axis 25 is between about 174° and 179°, and the other angle is between about 0.5° and 3°. For example, the inclination of the friction surface 22a relative to the aforementioned plane can be between about 174° and 179°.

The invention is susceptible of numerous additional modifications. For example, the features of some or all of the aforedescribed embodiments can be combined and/or interchanged, certain features are believed to constitute patentable innovations of a torque converter and/or of a lockup clutch per se, and certain features can be incorporated in presently known torque converters and/or lockup clutches to thus constitute patentable innovations.

Without further analysis, the foregoing will so fully reveal the gist of the present invention that others can, by applying current knowledge, readily adapt it for various applications without omitting features that, from the standpoint of the prior art, fairly constitute essential characteristics of the generic and specific aspects of the above-outlined contribution to the art and, therefore, such adaptations should and are intended to be comprehended within the meaning and range of equivalence of the appended claims.

What is claimed is:

1. A hydrokinetic torque converter comprising:

a housing having a fluid-containing chamber and being rotatable about a predetermined axis;

a pump, a turbine and a stator in said chamber; and an engageable and disengageable lockup clutch interposed between said housing and said turbine and comprising a piston movable in said chamber in the direction of said axis and dividing said chamber into a first compartment disposed at a first radial distance from said axis and a second compartment wherein the pressure of fluid varies when the converter is in use, at least one first friction surface carried by said piston and at least one second friction surface carried by a component rotatable with said housing, said friction surfaces confronting and being in engagement with each other in the engaged condition of said clutch and being disposed at a greater second radial distance from said axis, at least one of said piston and said component having at least one passage for the flow of fluid from said second compartment into said first compartment along said friction surfaces in the engaged condition of said clutch, at least one of said piston and said component being elastically deformable at said at least one passage and said at least one passage being configurated to permit variations of the rate of fluid flow therein as a function of variable fluid pressure in said second compartment and the elastic deformability of said at least one of said piston and said component.

2. The torque converter of claim 1, wherein said at least one passage is defined by a channel in at least one of said friction surfaces.

3. The torque converter of claim 1, wherein one of said piston and said component includes a friction lining and the respective one of said friction surfaces is provided on said friction lining, said at least one passage being defined at least in part by a channel in the friction surface of said friction lining.

4. The torque converter of claim 1, wherein at least a portion of said at least one passage extends substantially radially of said axis and at least said portion of said at least one passage has a cross-sectional area which varies radially of said axis.

5. The torque converter of claim 1, wherein said at least one passage extends substantially radially of said axis and has a cross-sectional area which decreases in a direction toward said axis.

6. The torque converter of claim 1, wherein said housing is rotatable in a predetermined direction and said at least one passage extends across said friction surfaces substantially radially of said axis and slopes outwardly in said predetermined direction.

7. The torque converter of claim 6, wherein said at least one passage has an arcuate shape.

8. The torque converter of claim 1, wherein said at least one passage is provided in at least one of said friction surfaces and includes an inlet disposed at a greater radial distance from said axis, an outlet at a lesser radial distance from said axis and a width which decreases at least substantially gradually in a direction from said inlet toward said outlet.

9. The torque converter of claim 1, wherein said at least one passage has an at least substantially constant depth.

10. The torque converter of claim 1, wherein said at least one passage includes a channel provided in at least one of said friction surfaces and having a depth of between 0.1 mm and 0.4 mm.

11. The torque converter of claim 1, wherein said at least one passage includes a channel in at least one of said friction surfaces.

12. The torque converter of claim 1, wherein the pressure of fluid in said first compartment differs from the pressure of fluid in said second compartment when the converter is in use and said at least one passage has an effective cross-sectional area which varies as a function of the difference between the fluid pressures in said compartments.

13. The torque converter of claim 12, wherein the effective cross-sectional area of said at least one passage decreases in response to increasing difference between the fluid pressures in said compartments.

14. The torque converter of claim 1, wherein the configuration and the dimensions of said at least one passage and the deformability of at least one of said piston and said component are such that the rate of fluid flow from said second compartment toward said first compartment is not proportional to the square root of the difference between the fluid pressures in said compartments.

15. The torque converter of claim 14, wherein the configuration and the dimensions of said at least one passage are related to the deformability of at least one of said piston and said component in such a way that the rate of fluid flow in said at least one passage is at least substantially constant within a major part of the operating range of the torque converter.

16. The torque converter of claim 1, wherein said first compartment is disposed between a wall of said housing and said piston as seen in the direction of said axis.

17. The torque converter of claim 1, wherein said housing includes a wall extending substantially radially of said axis and said piston is disposed between said wall and said turbine as seen in the direction of said axis.

18. The torque converter of claim 1, wherein said piston includes a friction lining and said at least one first friction surface is provided on said friction lining, said at least one passage including a channel in the friction surface of said friction lining.

19. The torque converter of claim 1, wherein said piston is elastically deformable.

20. The torque converter of claim 1, wherein at least one of said friction surfaces is a frustoconical surface.

21. The torque converter of claim 20, wherein said frustoconical surface makes an angle of between 174° and 179° with a plane which is normal to said axis.

22. The torque converter of claim 1, wherein said piston is an annular piston and includes a frustoconical portion adjacent said friction surfaces and making an angle of between 174° and 179° with a plane which is normal to said axis.

23. The torque converter of claim 1, wherein said component is of one piece with said housing.

* * * * *